July 7, 1959
O. L. ERVIN
2,893,543
CONVEYOR AND FEEDER
Filed Oct. 7, 1955
2 Sheets-Sheet 2
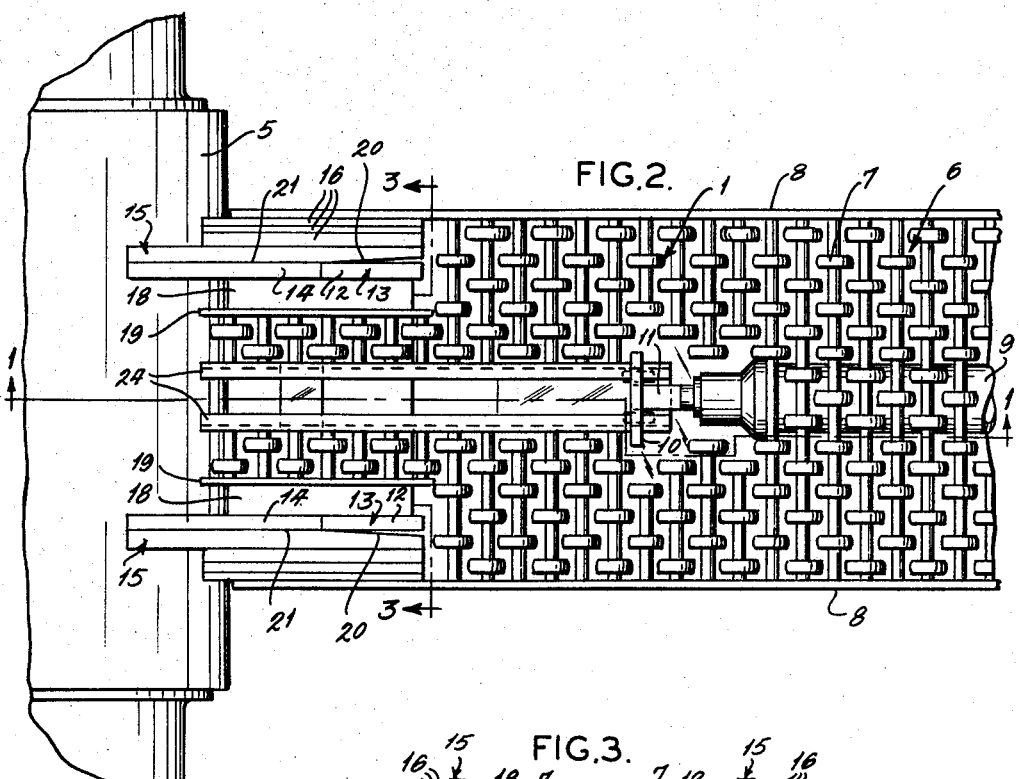
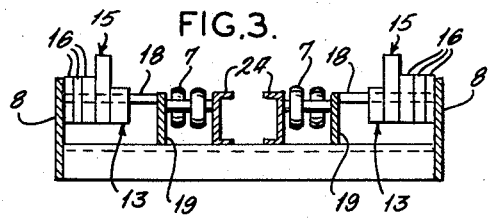
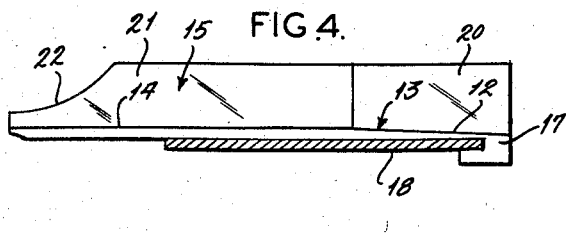
INVENTOR:
OVID L. ERVIN
By Leonel S. Goff
ATTORNEY.

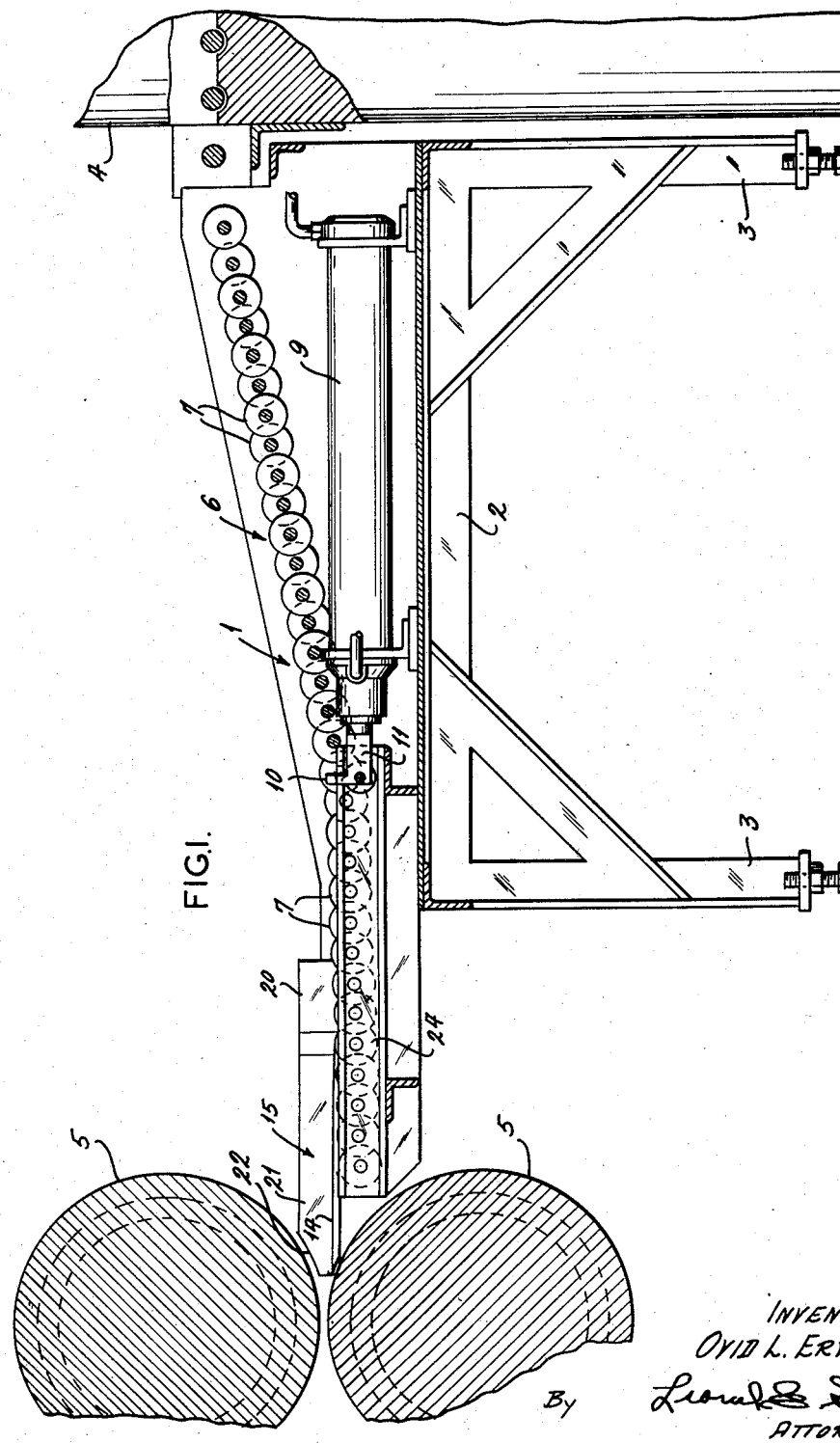

United States Patent Office 2,893,543
Patented July 7, 1959

2,893,543
CONVEYOR AND FEEDER

Ovid L. Ervin, Bunker Hill, Ill., assignor to Olin Mathieson Chemical Corporation, East Alton, Ill., a corporation of Virginia Application October 7, 1955, Serial No. 539,180

3 Claims. (Cl. 198—221)

This invention relates to a mechanism for conveying and feeding sheet material to a mill; and more specifically to a mechanism for conveying sheets from a furnace and feeding them into mill rolls between which they are roll bonded together.

In a process such has is described in U.S. Patent No. 2,690,002 a design is applied to a portion of the surface of a sheet of metal, such as aluminum or copper, to prevent welding of the coated portion of the surface to another surface. This material is known as a weld inhibitor. A second sheet of the same size is placed in face-to-face relationship with the design surface of the first sheet and the two sheets are lightly tacked together by any conventional means such as spot welding. The sheets are then heated and pass through mill rolls where they are welded together elongated and reduced in thickness. Two or more sheets may be welded together with a design of weld inhibiting material between adjacent sheets. The portion to which the design has been applied is then inflated to provide a heat exchanger or other useful article. Difficulty has been encountered in maintaining the pair of sheets to be rolled in proper alignment with the mill rolls. In the pressure welding process it is especially important to maintain the sheets in fixed relative position to each other with the leading edge of the sheets even with each other and parallel to the longitudinal axis of the rolls. If the sheets do not approach the rolls in proper alignment the initial contact with the rolls will move the sheets relative to each other with the result that they will not be in proper alignment after welding and distortion of design may occur with smearing of the weld inhibiting material. Another difficulty encountered is that the material being fed may tend to move freely toward the roll ahead of the feeder. This has the obvious disadvantage of permitting the material to get out of alignment with the rolls as well as destroying the synchronization of the process as a whole.

It is therefore an object of this invention to provide a conveying and feeding mechanism which will maintain the sheet or sheets in proper alignment with the mill rolls. Another object of this invention is to provide a conveying and feeding mechanism in which contact of the material being fed into the mill will be maintained with the feeding element. Another object of this invention is to provide a conveying and feeding mechanism which can feed a wide range of sizes of sheets, without adjustment. Another object of this invention is to provide a machine of simple rugged construction which is easy and inexpensive to maintain and which is simple in operation. Another object of this invention is to provide a conveying and feeding mechanism which is relatively light in weight and easy to adjust. Further objects and advantages will become apparent from the description and accompanying drawings in which:

Figure 1 is a sectional elevation view of the conveyor and feeder taken on the line I—I of Figure 2.

Figure 2 is a plan view illustrating an embodiment of the invention in which the conveying and feeding mechanism is shown with the upper mill roll removed.

Figure 3 is a sectional view taken on the line III—III in Figure 2.

Figure 4 is an enlarged sectional view showing details of a portion of the mechanism.

As described above, the sheets to be rolled are first lightly tacked together as by spot welding. They are then heated in a furnace to a predetermined temperature, from which they are conveyed to a pair of mill rolls where they are elongated, reduced in cross section and welded together in those areas not separated by weld inhibiting material.

This invention relates to a mechanism for conveying a sheet or sheets from the furnace and feeding them into the mill rolls. Upon leaving the furnace the material passes onto an inclined portion of a conveyor bed and rolls down to a horizontal portion of the bed on a plurality of independently pivoted rollers which provide the bed. When the material is on the horizontal portion of the conveyor bed the trailing edge is ahead of and is engaged by a pushing bar which advances it toward the mill rolls. To prevent the material from moving away from the pushing bar and freely toward the rolls and perhaps entering the rolls askew, a sheet lifting bar is provided on both sides of the conveyor bed and this bar is so arranged that the material is pushed up an inclined leading surface on each bar and out of contact with the rollers. The frictional engagement between the material and the lifting bar is sufficient to keep the material from moving ahead of the pushing bar. When the leading edge of the material first contacts the mill rolls the speed of the sheets is increased by the rolls pulling the sheets away from the pushing bar. The pushing bar returns to its initial position and is ready to receive another sheet and feed it into the mill rolls.

The conveying and feeding mechanism 1 is mounted on a platform 2 which is provided with four vertically adjustable legs 3 for alignment of the device with a furnace 4 and mill rolls 5. A conveyor bed 6 comprises a plurality of individually rotatable overlapping rollers 7 mounted on parallel axles secured to side frame members 8 attached to platform 2. Channel members 24 support the inner ends of the axles in the center of the horizontal portion of the bed. Also mounted on the platform is a power cylinder 9 for actuating a sheet pusher bar 10 mounted on the end of piston rod 11. As may be best seen in Figure 1, the pusher bar 10 projects through an opening in the conveyor roller bed 6. It is not necessary to adjust the pusher bar because as seen in Figure 1, in the retracted position the pusher bar 10 is below the level of the rollers so that as the sheets move down the inclinded portion of the conveyor bed 6 they pass over the pusher bar and onto the horizontal portion of the conveyor bed with the trailing edge of the sheets ahead of the pusher bar. The pusher bar is then moved in the direction toward the mill rolls 5 by the power cylinder 9 which may be actuated by hand or by an automatic control (not shown) mounted below the horizontal portion of the conveyor bed 6 and having a control finger (not shown) projecting above the bed to be depressed by the weight of the sheets to actuate the power cylinder. As the sheet pushing bar 10 moves toward the reduction rolls 5 it engages the trailing edges of the sheets and as the sheets move toward the rolls they engage an inclined surface 12 on the sheet lifting bars 13 mounted on both sides of the conveyor bed. The horizontal portion 14 of the sheet lifting bars is above the level of the horizontal portion of the conveyor bed rollers 7 and the inclined portion 12 has its receiving end below the top of the rollers to act as a ramp for the sheets. The frictional engagement between the lower sheet and the sheet lifting bars is sufficient to retard the movement of the sheets so that the trailing edge of the sheets will maintain contact with and engage the entire front face of the pusher bar 10 thereby maintaining proper alignment of the leading edge of the sheet with the axis of the mill rolls. The pusher bar moves the sheets across the sheet lifting bars and into the mill rolls. Side guides 15 are provided adjacent the lifting bars 13 and between the lifting bars and side frame members 8. Shims 16 may be provided between side frame members and the side guides 15 to provide the desired spacing between the guides. The guides and lifting bars have their receiving ends provided with hooks 17 best shown in Figure 4 which engage around the front end of bed plates 18. Bed plates 18 are welded to the side frame member 8 and a bar 19 running longitudinally of the bed and secured to a cross-brace. The bar 19 in addition to supporting the inner ends of the bed plates, also supports the outer ends of the roller axles. As seen in Figure 2 the side guides 15 are tapered as at 20 to lead the sheets between the parallel portions 21 of the guides. Referring to Figure 4 the guides have their other ends 22 shaped to conform to the nip of the mill rolls. Hooks 17 on the side guides 15 and lifting bars 13 prevent these members from being drawn into the mill rolls.

The speed of the mill rolls 5 is adjusted so that as the sheets engage the rolls the speed of the sheets is increased sufficiently that they are drawn away from the sheet pusher bar 10. The piston rod 11 of power cylinder 9 moves the sheet pusher bar 10 forward at a slow rate of speed and may return it to its initial position at a more rapid speed. The sheet pushing bar 10 may be so powered as to have a slow initial velocity increasing in speed as the sheets approach the rolls to reduce jar when the sheets are picked up by the rolls. As will be noted from Figure 1, the sheet pusher bar 10 is below the top of the rollers 7 of the inclined portion of the conveyor bed, in the retracted position and it is only necessary that the trailing edge of the sheets pass sufficiently ahead of the pusher bar so that the bar will engage the trailing edge of the sheets. So long as the pusher bar engages the trailing edges of the sheets they will advance until their leading edges engage the mill rolls whereupon the sheets will accelerate in speed as previously described, and be drawn away from the pusher bar. The sheet pusher bar travels to the end of its stroke without affecting the sheets after they have been picked up by the rolls.

It is to be understood that although this invention is intended primarily for use in conjunction with the roll bonding process, it is not limited to this use or specific embodiment. Various forms of conveyor beds may be substituted for the roller bed shown and other forms of reciprocating drive mechanisms may be utilized in place of the power cylinder shown without departing from the scope of this invention. It is also to be understood that although the invention is described with particular reference to rolling mill operation and the pressure welding process, the invention is not to be limited to these specific applications and obviously the mechanism may be utilized to feed single sheets rather than a pair of sheets. Although specific details are set forth in the foregoing, it will be understood that various changes may be made without departing from the spirit and scope of this invention and this invention is not to be limited to such details except as set forth in the appendent claims.

I claim:

1. A conveying and feeding mechanism comprising a conveyor bed having an inclined portion and a substantially horizontal portion, a bar extending through a gap in the inclined portion of said bed parallel to and above the plane of the horizontal portion of said bed, said bar being retractable in said gap in and behind the inclined portion of said bed to permit the conveyed material to pass down the inclined portion of the bed and onto the horizontal portion, and means to move said bar in a substantially horizontal plane in the direction of the longitudinal axis of the horizontal portion of said conveyor bed.

2. A conveying and feeding device comprising a conveyor bed having an inclined portion and at the lower end thereof a substantially horizontal portion, said horizontal portion having an edge away from said inclined portion, a bar extending through a gap in said conveyor bed and means to move said bar in a substantially horizontal plane above and parallel to the plane of said horizontal portion from a retracted position adjacent the junction of said horizontal and inclined portions of said bed to a position adjacent said edge of the horizontal portion of said bed, said bar in its retracted position being below and behind the inclined portion of said bed.

3. The conveying and feeding mechanism of claim 2 and said horizontal bed portion including friction reducing means, a pair of bars on either side of the horizontal portion of said bed, said bars having a horizontal portion above the plane of said friction reducing means of the horizontal portion of said bed and an inclined portion extending from the horizontal portion of said bars away from said edge and downwardly to the plane of said friction reducing means of the horizontal portion of said bed, whereby the inclined portion of said bars provides a ramp for the sheet on said friction reducing means.

References Cited in the file of this patent

UNITED STATES PATENTS

| | | |
|---|---|---|
| 923,944 | Capron | June 8, 1909 |
| 1,778,267 | McArthur | Oct. 14, 1930 |
| 1,959,095 | Etherington | May 15, 1934 |
| 1,980,261 | Fenton | Nov. 13, 1934 |
| 1,996,913 | Evans | Apr. 9, 1935 |
| 2,087,927 | Schmid | July 27, 1937 |
| 2,114,108 | Hormel | Apr. 12, 1938 |
| 2,131,967 | Perpopat | Oct. 4, 1938 |
| 2,181,211 | Sieg | Nov. 28, 1939 |
| 2,325,738 | Braugle | Aug. 3, 1943 |
| 2,557,308 | Nippert | June 19, 1951 |
| 2,559,369 | Phillips | July 3, 1951 |
| 2,635,875 | Werner | Apr. 21, 1953 |
| 2,686,672 | Leach | Aug. 17, 1954 |
| 2,801,103 | Socke | July 30, 1957 |

FOREIGN PATENTS

| | | |
|---|---|---|
| 514,137 | Great Britain | Oct. 31, 1939 |